United States Patent [19]
Goulart

[11] 3,815,429
[45] June 11, 1974

[54] PRECISION NON-TRANSLATING MIRROR/LENS MOUNT

[75] Inventor: Harold S. Goulart, Washington, D.C.

[73] Assignee: The United States of America as represented by the Secretary of the Navy, Washington, D.C.

[22] Filed: Apr. 19, 1973

[21] Appl. No.: 352,829

[52] U.S. Cl. .............................. 74/89.15, 350/310
[51] Int. Cl. ............................................ F16h 27/02
[58] Field of Search ................... 123/188; 74/89.15; 350/310, 288

[56] References Cited
UNITED STATES PATENTS
3,025,841  3/1962  Beckham ........................ 123/188
3,407,018  10/1968  Miller ............................. 74/89.15
3,463,019  8/1969  Noe ................................. 74/89.15
3,577,791  5/1971  Brocek ............................ 74/89.15

Primary Examiner—Samuel Scott
Assistant Examiner—Wesley S. Ratliff, Jr.
Attorney, Agent, or Firm—R. S. Sciascia; Arthur L. Branning; M. L. Crane

[57]  ABSTRACT

A mirror mounting and adjusting means which permits precise, remote, adjustment of the fully reflecting mirror in a laser cavity within an environment subject to large mechanical and/or acoustical vibration.

7 Claims, 2 Drawing Figures

PATENTED JUN 11 1974 3,815,429

PRECISION NON-TRANSLATING MIRROR/LENS MOUNT

BACKGROUND OF THE INVENTION

This invention relates to a mirror mount for optical use such as in a laser cavity and more particularly to a remote control accurately adjustable mirror or optical lens mount.

Heretofore, adjustable mounts have been used for optical lens or mirrors in different optical paths such as a laser cavity. Prior art devices have their adjusting means at the mirror mount usually in the form of threaded screws or micrometers positioned either in the vertical or horizontal planes. These prior art devices are convient for use with mirrors or lenses usable in the open for easy access or in optical cavities which are not subject to harsh vibrations. The prior art devices make use of springs, bellows, hinges, etc. to aid in adjusting the mirror/lens alignment. These elements are not built for harsh vibrations, consequently they do not stand-up under rugged use in vibration prone assemblies.

SUMMARY OF THE INVENTION

This invention is directed to a mirror or lens holder which secures a mirror or lens in place against movement due to vibrational forces. The holder is easily adjusted remotely and held in place against rotational movement. A long shaft secured with the mirror holder allows manipulation of the mirror mount outside the sphere of rotation thereby allowing non-interacting vertical and horizontal adjustments.

STATEMENT OF THE OBJECTS

It is therefore an object of the present invention to provide an accurate precise adjustable remotely controlled lens or mirror holder.

Another object is to provide an optical mirror or lens holder which is held constantly in place against vibrational movement.

Still another object is to provide a lens or mirror holder which will permit precise continued alignment of a lens or mirror under vibrational movement conditions.

Yet another object is to provide a mirror holder capable of securing a mirror on the center of rotation of a face plate while remaining fixed longitudinally and transversely thereby retaining a fixed position relative to a remote point.

Other objects and advantages of this invention will become obvious to those skilled in the art from a reading of the following specification when considered with the drawing.

DESCRIPTION OF THE DEVICE

Figure 1:
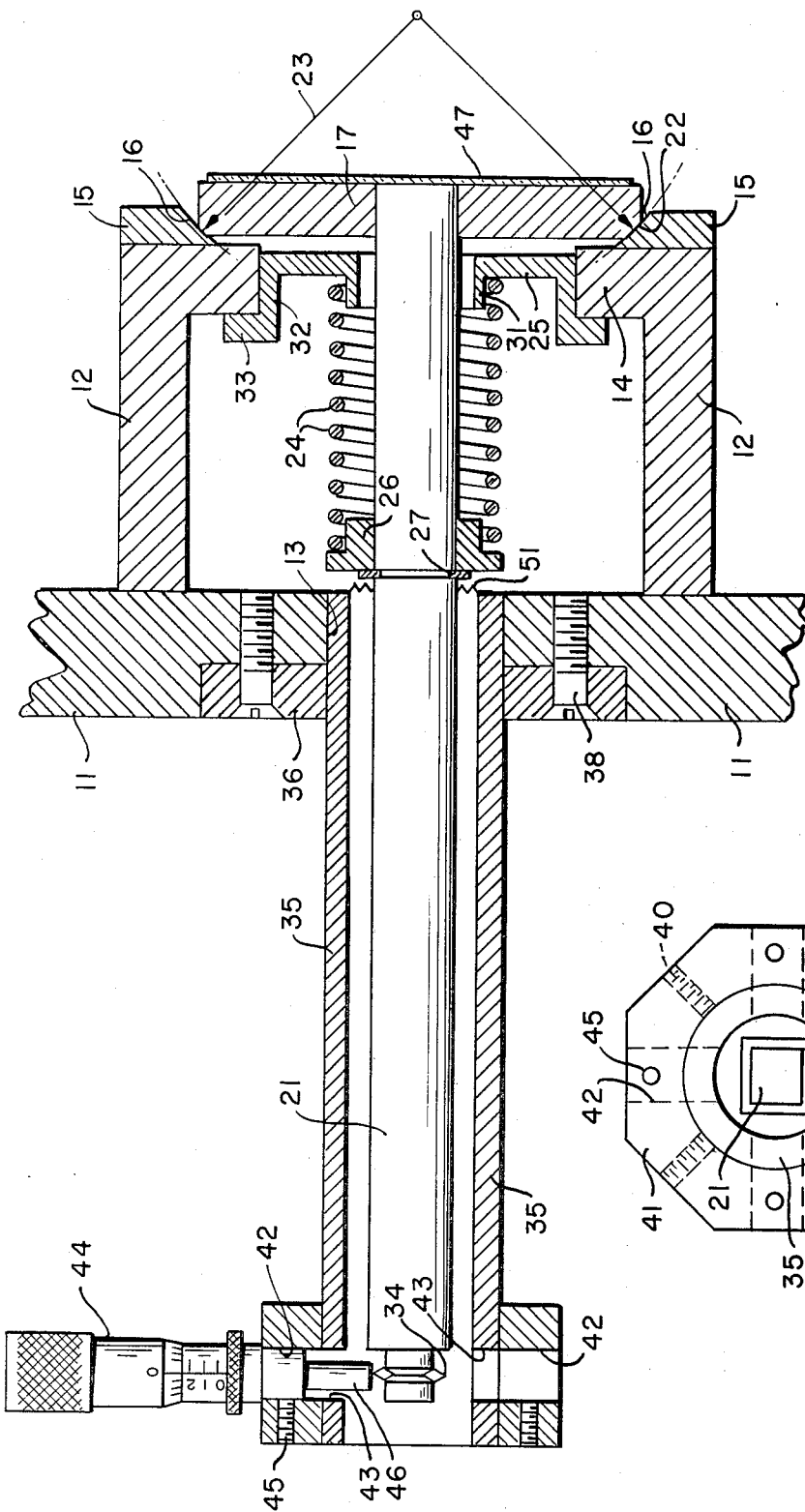
FIG. 1 is a cross-sectional view of the device which illustrates the relative parts.
Figure 2:
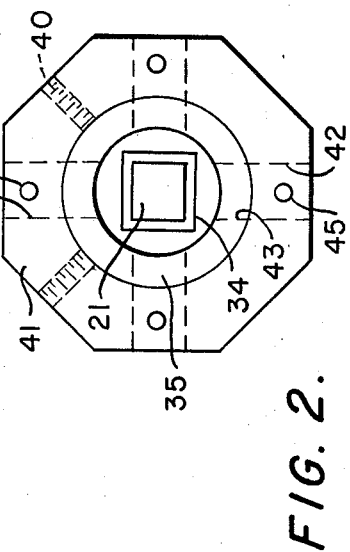
FIG. 2 is an end view which illustrates the relative parts of one end.

Now referring to the drawing, there is shown a cross-sectional view of the device illustrating the relative parts. The device is made for remote operation and may be secured to a supporting stand or a wall structure 11 such as a heavy-plate with the mirror on one side of the wall and the adjusting mechanism on the opposite side of the wall. A temperature compensating cylindrical tube 12 is secured to the wall structure and centered about an aperture 13 through the wall. The cylindrical tube 12 has an inward, radially extending end portion 14 that provides a support for a cylindrical ring 15 having the same outer diameter as said cylindrical tube 12. The inner face 16 of the ring 15 defines the frustum of a cone whose included angle is 90°. The ring 15 is secured coaxially with the cylindrical tube 12 and the aperture 13 through the support 11. A face plate 17 having an axially aligned aperture 18 therein is secured onto one end of an elongated shaft 21 made of steel or any other suitable metal which fits into the aperture 18. The shaft 21 extends outwardly through the aperture 13 in the support 11. The face plate is made with a spherical land 22 ground on the edge that seats into the conical surface 16. The spherical land has a radius 23 and the width of the spherical land presents a section of a sphere to the 90 degree included angle of the core 16.

The face plate 17 is held firmly in place by a heavy spring 24 surrounding the shaft 21 and held in place under compression between a loading plate 25 and a centering bushing 26 which is held in place by a lock ring 27. The centering bushing is provided with a flange against which the spring is forced and the loading plate is provided with a central hub 31 which is of a greater diameter than the shaft 21 for free movement of the shaft. The loading plate extends outwardly to a portion 32 that fits within the end portion 14 of the cylindrical tube 12 and is provided with a flange 33 that extends along the radial surface of the end portion. The loading plate in cooperation with the bushing exerts a force on the face plate to hold the face plate firmly within the conical surface.

The outer end of the shaft 21 is machined down to form a squared knife edge surface 34. The outwardly extending portion of the shaft extends through a tube 35 that is secured at one end to the supporting wall 11. As shown, the end of the tube fits tightly within the aperture within the supporting wall and is held in place by a plate 36 that fits into recess 37 through the use of screws or bolts 38. The plate is secured to the tube 35 and aids in supporting the tube. The opposite end of the tube has connected thereto a housing 41 or sleeve which may be screw threaded onto the tube or secured by other suitable means. The sleeve may be held in place by use of set screws in threaded holes 40 which seat against the tube 21.

The housing 41 is provided with oppositely disposed apertures 42 spaced 90 degrees apart which align with apertures 43 in the end of tube 35. A micrometer 44 is secured within each aperture 42 by use of a set screw 45 such that their movable spindles 46 contact the knife edge formed on the shaft. The micrometers may be positioned horizontally and vertically and are adjusted within their holders such that the shaft axis is perfectly centered, with each micrometer spindle extended for the same reading to allow for movement of the spindle in each direction.

A mirror or optical reflector 47 to be manipulated is secured to the face of the plate 17 such that its front center is in alignment with the center of the front plate which also falls on the center of the radius 23. Elevation or depression of the shaft 21 is accomplished by turning one vertical micrometer in while turning the outer out a like amount. Azimuth adjustment is carried out by turning the horizontal micrometer in a like manner. Since the knife edge is formed into a square and the micrometer spindles are in contact therewith, the shaft will be prevented from rotation due to vibration. As the shaft end is adjusted by the micrometers, so will the face plate and mirror thereon be adjusted. Since the face plates outer edge is cut on a sphere, the face plate will rotate evenly within the conical holder about the radius of the sphere with the mirror rotating about its center in accordance with movement of the shaft due to movement of the micrometers.

The spring 24 applies considerable force on the face plate to maintain its seat which functions to prevent leakage of gases from without or within. Thus, gases may be added to the chamber within which the mirror is mounted or the chamber may be evacuated. In the event the chamber pressure is critical and insurance against gaseous leakage is required, a bellows 51 may be added between the shaft 21 and the tube 35 or the support 11. Obviously, the mirror mount may be used in the open for reflecting radiation; therefore, no gas leakage problems would be encountered and the bellows would not be required.

Obviously, the mirror mount may be used to reflect radiation from a mirror mounted thereon in various optical systems.

In a laser optical cavity, the mirror as shown can be used as a fully reflective mirror. For use to mount a partially reflective mirror, the solid shaft 21 may be a tube and the radiation passing through the mirror will pass out through the tube. As such, the mirror mount may be used in an optical cavity to mount a fully reflective or partially reflective mirror and yet maintain good alignment.

The face plate has been described as having the edge cut on a spherical radius and seated in a conical surface. It will be obvious to those skilled in the art that the conical surface may be made spherical and the spherical edge of the face plate then would ride in a section of a sphere.

Further, the adjustment of the shaft relative to the axis may be carried out by other adjusting mechanisms such as wedges on the shaft with an appropriate mechanical means, a lever connected with the shaft or by an electrical drive means. The important thing is that a fine adjustment be made.

Obviously many modifications and variations of the present invention are possible in the light of the above teachings. It is therefore to be understood that within the scope of the appended claims the invention may be practiced otherwise than as specifically described.

What is claimed is:

1. An adjustable mirror mount useful in an optical system; which comprises,
 a support means,
 a face plate upon which a mirror is mounted,
 said face plate comprising a shaped outer edge,
 a seat supported by said support means coaxial with said face plate for receiving said face plate with said shaped outer edge seated within said seat and movable thereto,
 an elongated shaft secured to said face plate coaxial longitudinally therewith,
 said shaft extending from said face plate through said support means,
 means secured to said shaft for forcefully securing said face plate within said seat,
 sleeve means secured to said support means relative to said shaft extension, and
 adjusting means secured to said sleeve means angularly for adjusting said shaft and said mirror relative to the longitudinal axis of said face plate.

2. An adjustable mirror mount as claimed in claim 1; wherein,
 said seat for receiving said face plate is a frutum of a cone with the seat a flat surface.

3. An adjustable mirror mount as claimed in claim 2; wherein,
 the included angle of said frustum of a cone is 90°.

4. An adjustable mirror mount as claimed in claim 3; wherein,
 said outer shaped edge of said face plate is cut on the radius of a sphere with the center of the sphere on the center line through said face plate and said shaft secured thereto.

5. An adjustable mirror mount as claimed in claim 4; wherein,
 said means secured to said shaft for forcing said face plate into its seat is a spring surrounding said shaft.

6. An adjustable mirror mount as claimed in claim 5; wherein,
 said means secured to said support relative to said shaft is a tubular sleeve surrounding said shaft.

7. An adjustable mirror mount as claimed in claim 6; wherein,
 said adjustable means is secured to the outer end of said sleeve, and
 said adjustable means includes two pair of oppositely disposed micrometers, each micrometer positioned 90° apart and surrounding said shaft.

* * * * *